United States Patent [19]
Hawkins et al.

[11] Patent Number: 5,469,356
[45] Date of Patent: Nov. 21, 1995

[54] SYSTEM FOR CONTROLLING A VEHICLE TO SELECTIVELY ALLOW OPERATION IN EITHER AN AUTONOMOUS MODE OR A MANUAL MODE

[75] Inventors: Mark R. Hawkins, Chillicothe; Joel L. Peterson, East Peoria, both of Ill.

[73] Assignee: Caterpillar Inc., Peoria, Ill.

[21] Appl. No.: 299,447

[22] Filed: Sep. 1, 1994

[51] Int. Cl.⁶ .................................................. G06F 165/00
[52] U.S. Cl. .............................. 364/424.02; 364/424.07; 318/591
[58] Field of Search .................. 364/424.01, 424.02, 364/424.07, 426.04, 424.1, 449; 318/587, 591; 180/167, 168, 169; 348/114, 118, 119, 120

[56] References Cited

U.S. PATENT DOCUMENTS

| | | | |
|---|---|---|---|
| 4,817,000 | 3/1989 | Eberhardt | 364/443 |
| 4,839,835 | 6/1989 | Hagenbuch | 364/567 |
| 5,023,790 | 6/1991 | Luke, Jr. | 364/424.02 |
| 5,054,569 | 10/1991 | Scott et al. | 180/167 |
| 5,170,352 | 12/1992 | McTamaney et al. | 364/424.02 |

OTHER PUBLICATIONS

*A Real-Time Reflexive Pilot for an Autonomous Land Vehicle*, IEEE Control Systems Magazine, Feb. 1986, pp. 14–23.

*A Pilot for a Robotic Vehicle System*, FMC Corporation, Paper No. TA9-10:30,, pp. 951–955.

PCT Appl. No. 89/05580; Int'l Pub. Date: Jun. 27, 1991; Int'l Pub. No.: WO 91/09375.

PCT Appl. No. 90/07183; Int'l Pub. Date: Jun. 27, 1991; Int'l Pub. No.: WO 91/09275.

*Primary Examiner*—Michael Zanelli
*Attorney, Agent, or Firm*—Sterne, Kessler, Goldstein and Fox

[57] ABSTRACT

A system for controlling autonomous operation of a vehicle in response to speed and steering angle request signals from a navigator allows manual operation of the vehicle. The system includes a machine control module, an engine control module, and a transmission control module. An auto/manual select signal indicates to the machine control module whether operation should be in a fully autonomous mode or a manual mode. In the autonomous mode, a navigator produces a speed request signal and a steering angle request signal for the vehicle. The machine control module receives the speed and steering angle request signals from the navigator. From these inputs, the machine control module produces an engine RPM (revolutions per minute) control signal for the engine control module, a transmission control signal for the transmission control module, a brake control signal, and a steering angle control signal. In the manual mode, the machine control module will not interfere with normal, manual (i.e., manned) control of all vehicle systems.

12 Claims, 6 Drawing Sheets

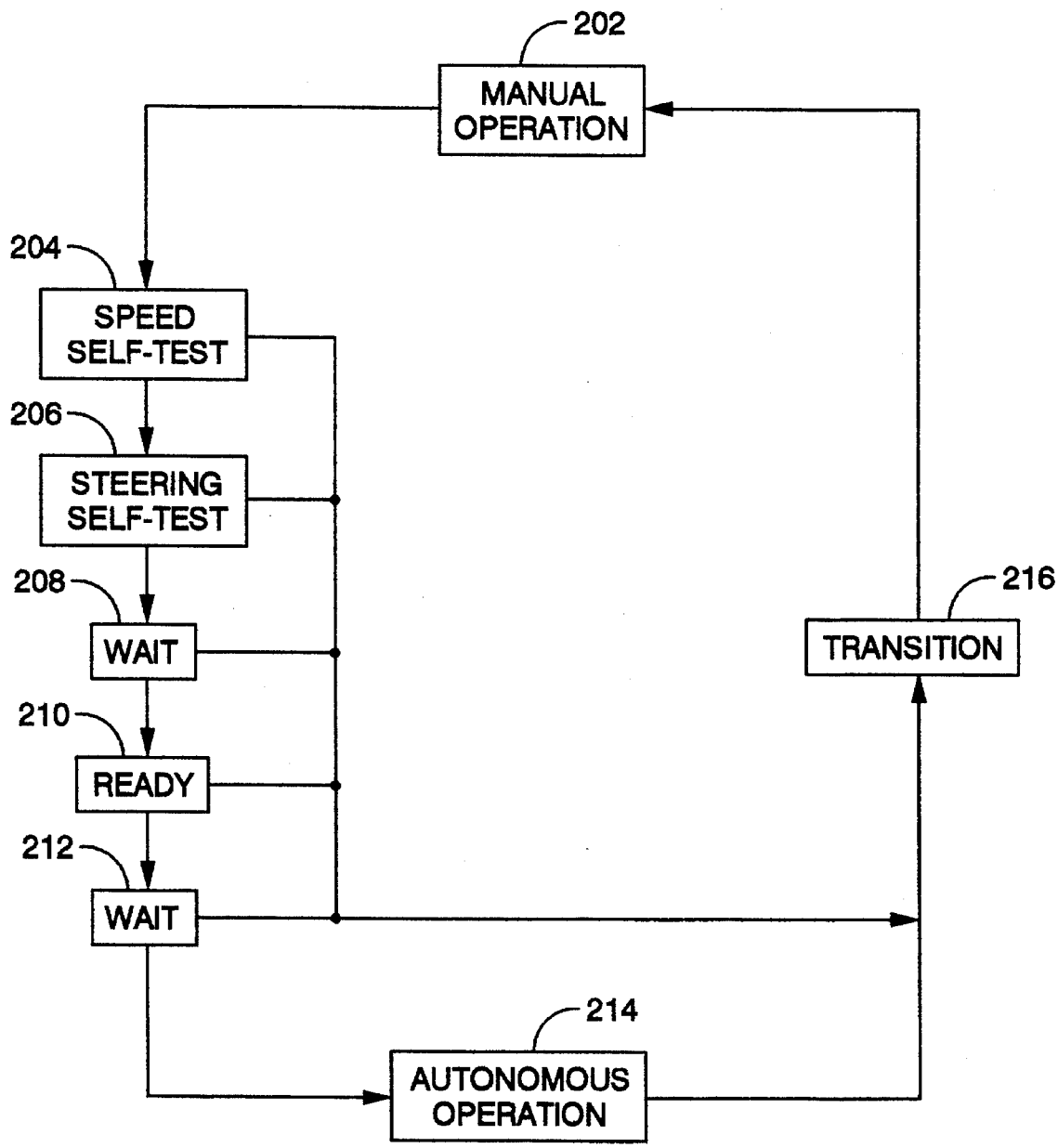
Fig_2_

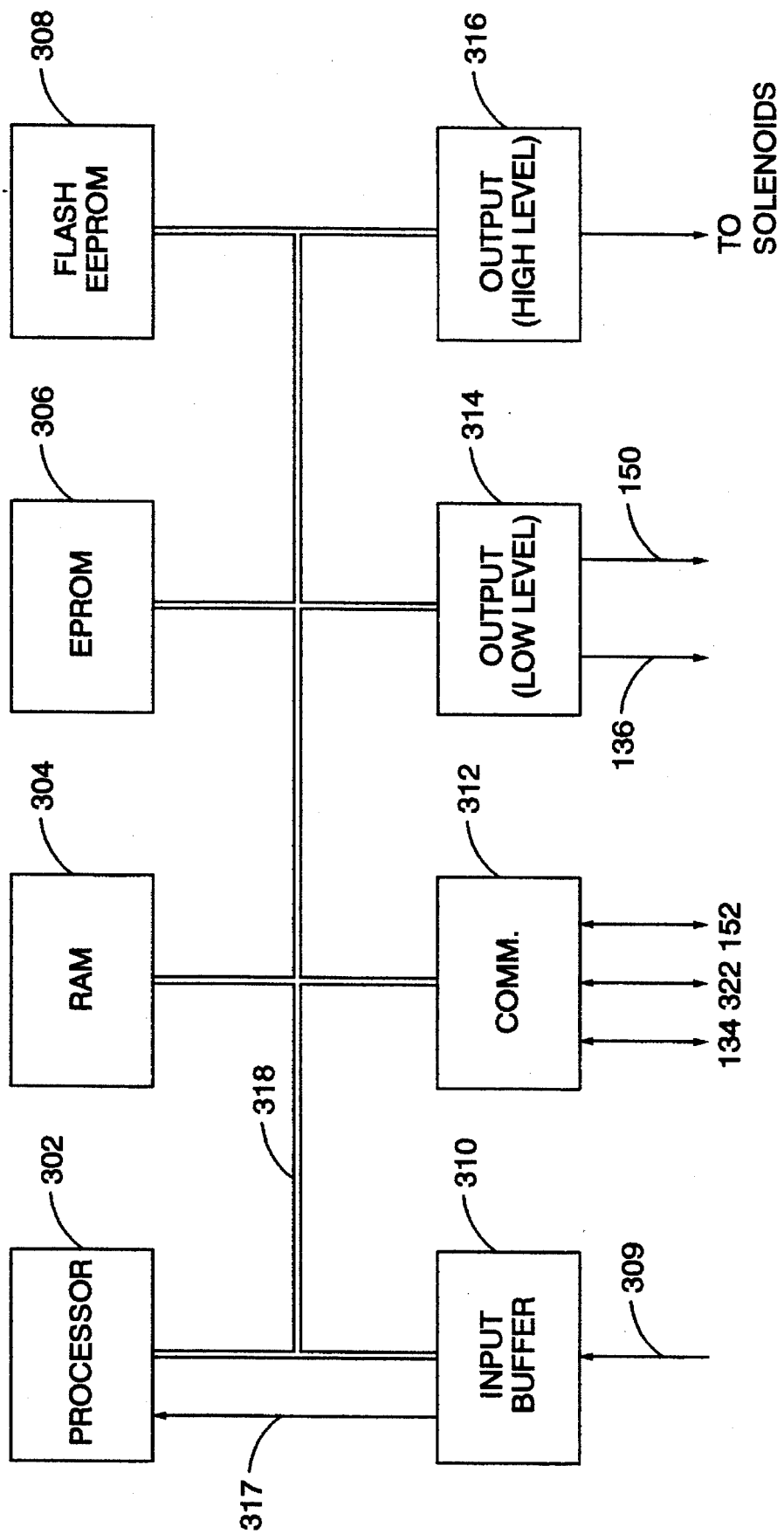

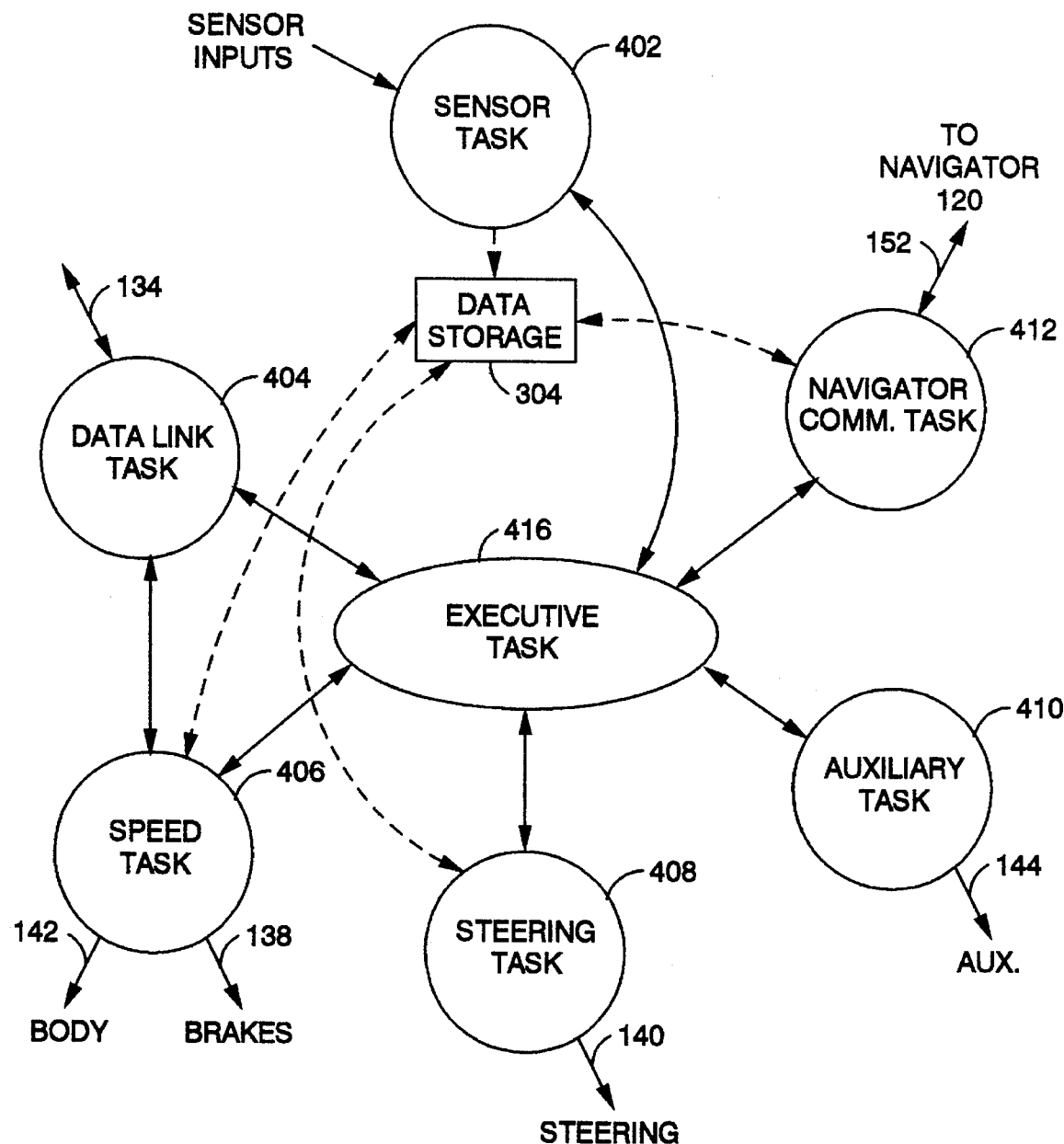
Fig_4_

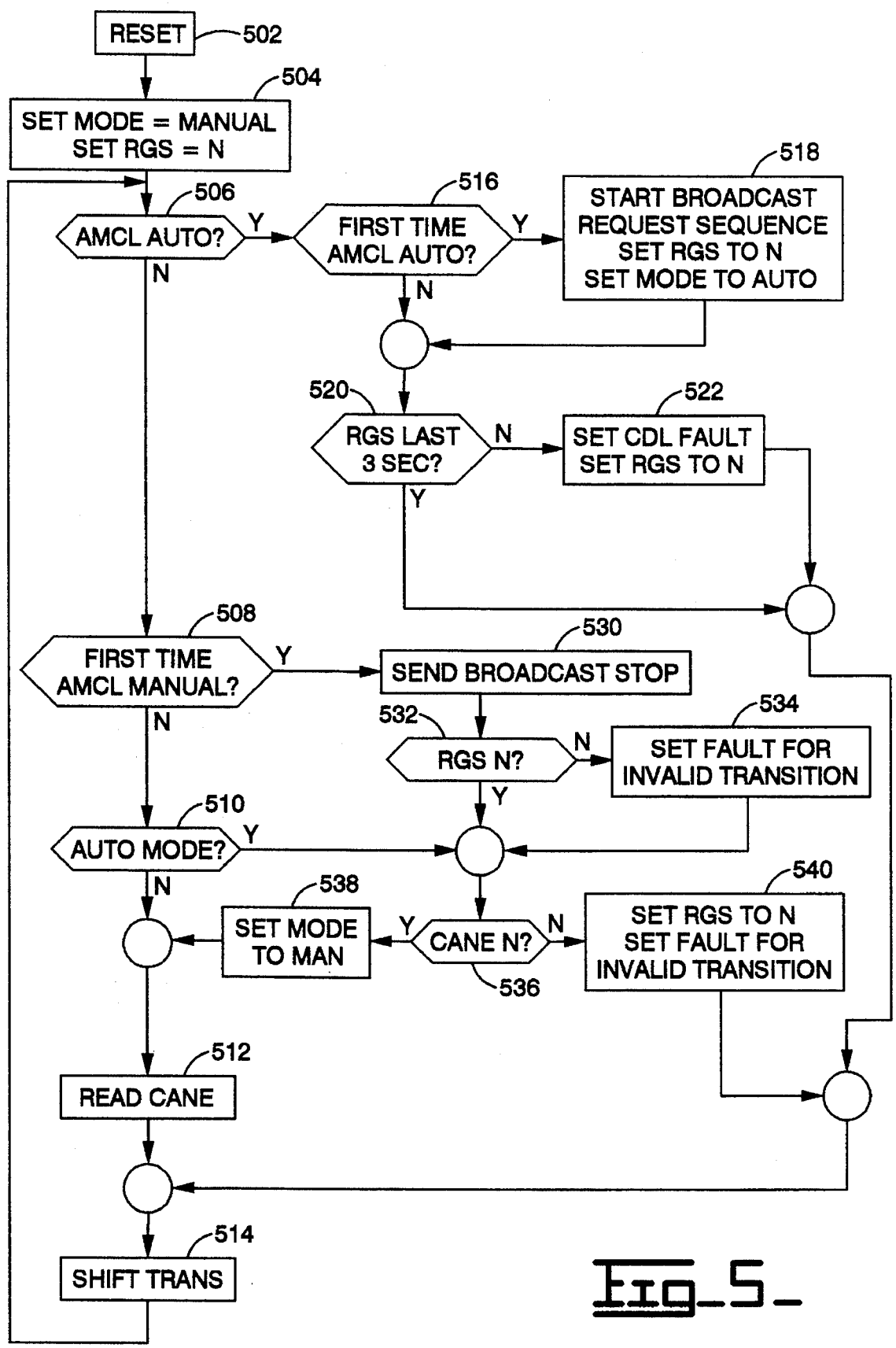

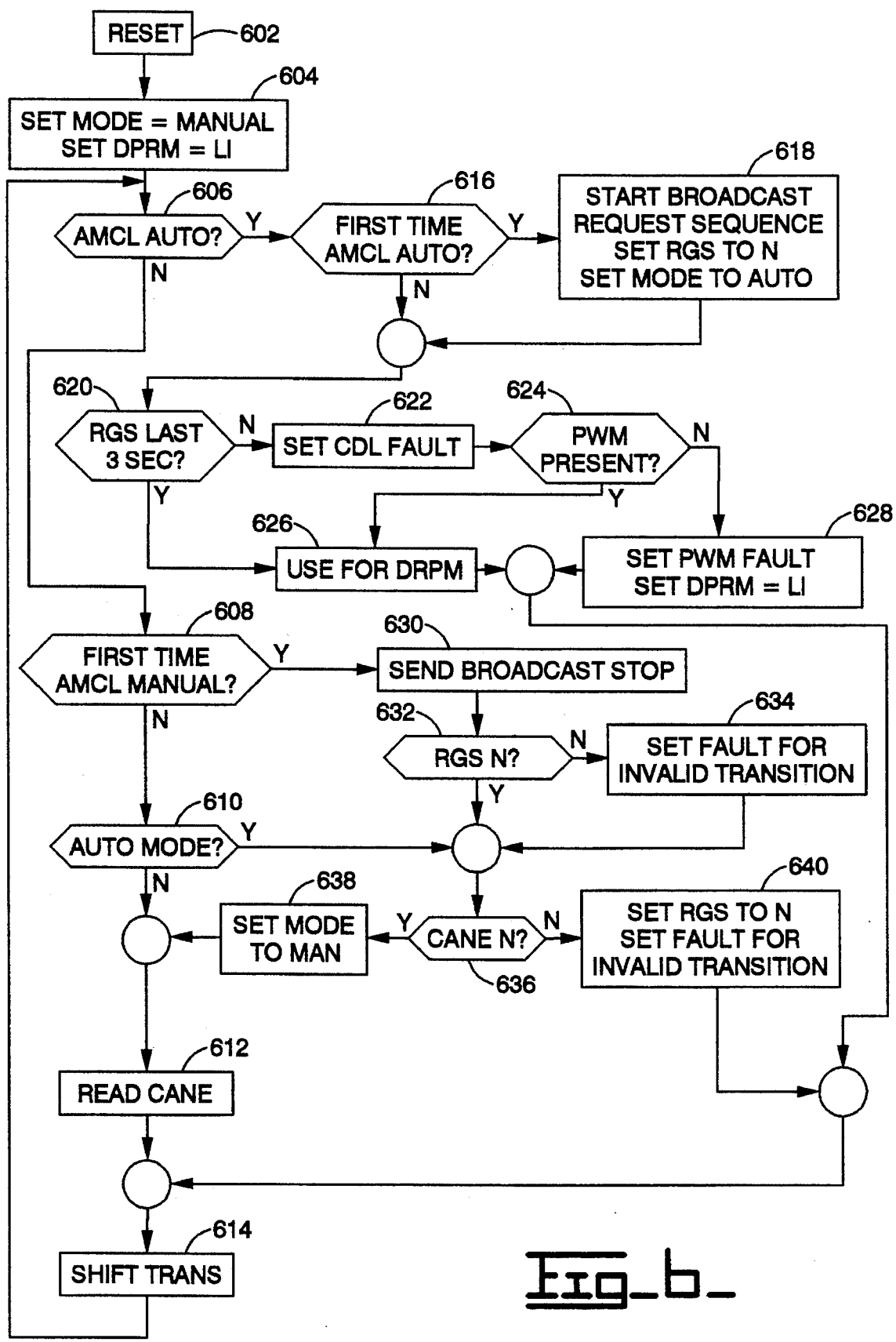
Fig_b_

5,469,356

SYSTEM FOR CONTROLLING A VEHICLE TO SELECTIVELY ALLOW OPERATION IN EITHER AN AUTONOMOUS MODE OR A MANUAL MODE

BACKGROUND OF THE INVENTION

1. Field of the Invention

This invention relates generally to the control of autonomous vehicles and, more particularly, to a system for controlling an autonomous vehicle which allows selective operation in either an autonomous mode or a manual mode.

2. Related Art

Caterpillar Inc. of Peoria, Ill., manufactures off-road mining vehicles. For example, the Caterpillar 777C is an off-road mining truck. The 777C includes sophisticated electronic monitoring and control systems. For example, an advanced diesel engine manager (ADEM) controls engine speed in response to input from an operator-controlled accelerator pedal; an electronic programmable transmission control (EPTC) assures that the transmission is in the proper gear; and a vital information management system (VIMS) monitors vehicle systems and provides status information to the driver/operator.

Commonly owned, U.S. Pat. No. 5,390,125, filed Feb. 18, 1993, "Vehicle Position Determination System and Method," the full text of which is incorporated herein by reference, discloses an autonomous vehicle system for use with a mining vehicle such as the 777C truck. What is needed is a means for integrating the commercially available electronic monitoring and control systems of a manned vehicle with an autonomous vehicle system such as that described in the '540 application to produce a vehicle which may be selectively operated in either a manual (i.e., manned) mode or an autonomous mode.

SUMMARY OF THE INVENTION

The invention is a system for controlling a vehicle, such as a mining truck, to selectively allow operation in either an autonomous mode or a manual mode. The system includes a machine control module, an engine control module, and a transmission control module. In the autonomous mode, a navigator produces a speed request signal and a steering angle request signal for the vehicle. The machine control module receives an auto/manual select signal from an operator and the speed and steering angle request signals from the navigator. From these inputs, the machine control module produces an engine RPM (revolutions per minute) control signal, a transmission control signal, a brake control signal, a steering angle control signal, and an auto/manual control signal.

The engine control module controls an RPM of the engine of the vehicle in response to the engine RPM control signal when the auto/manual control signal indicates autonomous operation. When the auto/manual control signal indicates manual operation, the engine control module controls engine RPM in response to manual input from an operator, i.e., from an accelerator pedal similar to those found in automobiles.

The transmission control module controls gear selection in a transmission of the vehicle in response to the transmission control signal when the auto/manual control signal indicates autonomous operation. When the auto/manual control signal indicates manual operation, the transmission control module controls gear selection in response to operator input, i.e., from a shift lever or cane.

In the preferred embodiment of the invention, the machine control module is a computer-based system including a navigator communications task, a sensor task, an executive task, a speed control task and a steering task. The navigator communications task receives the speed and steering angle requests from the navigator. The sensor task receives a measured steering angle, a measured speed and an auto/manual select signal from various switches and/or sensors. The executive task supervises operation of the other tasks and generates an auto/manual control signal in response to the auto/manual select signal. The steering task controls vehicle steering in response to the steering angle request signal and the measured steering angle.

The speed control task controls vehicle speed in response to the speed request signal and the measured speed by generating the engine RPM control signal, the transmission control signal and the brake control signal. The speed control task may control other vehicle functions. For example, it may control the position of a body or bed of a dump truck or the bucket of a wheel loader.

The machine control module further includes a data link task and an auxiliary task. The data link task communicates the engine RPM control signal to the engine controller and the transmission control signal to the transmission controller. The auxiliary task controls auxiliary functions on the vehicle, such as lights and horn.

The foregoing and other features and advantages of the invention will be apparent from the following, more particular description of a preferred embodiment of the invention, as illustrated in the accompanying drawings.

BRIEF DESCRIPTION OF THE FIGURES

FIG. 2 is a flow chart illustrating the steps involved in switching operation of a vehicle between manual and auto modes of operation;

FIG. 3 is a block diagram illustrating the structure of the machine control module of the invention;

FIG. 4 is a task diagram illustrating the operation and organization of the machine control module of the invention;

FIG. 5 is a flow chart illustrating auto and manual operation of an EPTC in accordance with the present invention; and FIG. 6 is a flow chart illustrating auto and manual operation of an ADEM in accordance with the present invention.

DETAILED DESCRIPTION OF THE PREFERRED EMBODIMENT

Figure 1:
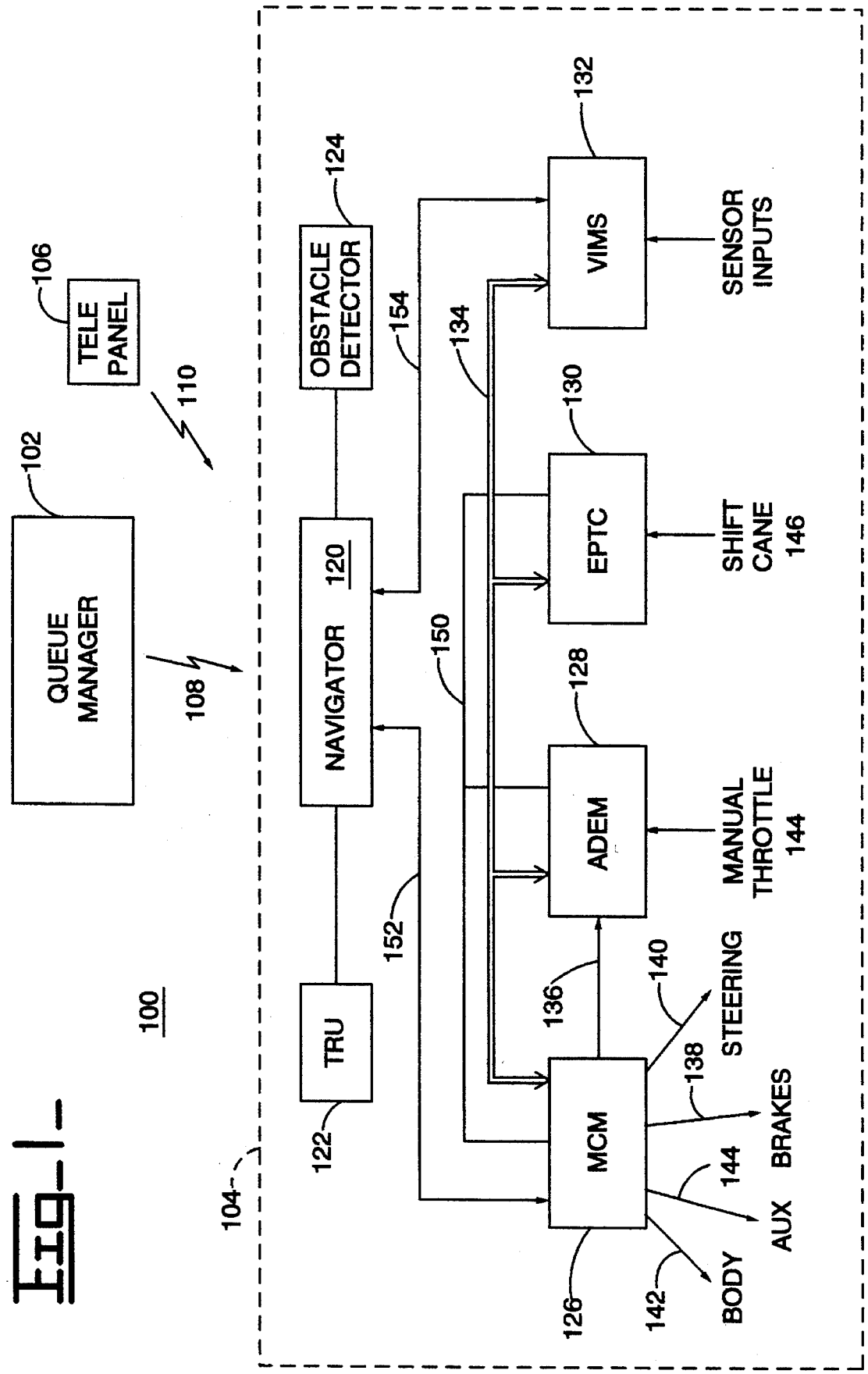
FIG. 1 is a high level block diagram showing the autonomous vehicle system of the invention.

The preferred embodiment of the invention is discussed in detail below. While specific part numbers and configurations are discussed, it should be understood that this is done for illustration purposes only. A person skilled in the relevant art will recognize that other components and configurations may be used without parting from the spirit and scope of the invention.

The preferred embodiment of the invention is now described with reference to the figures where like reference numbers indicate like elements. In addition, the left-most digit of each reference number indicates the figure in which the number is first used.

System Overview

FIG. 1 is a high level block diagram showing an autonomous vehicle system 100. Autonomous vehicle system 100 includes a fleet manager 102 and a vehicle control system 104. System 100 may also include a tele-operation panel 106 as discussed in further detail below.

Fleet manager 102 is configured to manage a fleet of autonomous mining vehicles such as dump trucks. Fleet manager 102 acts like a foreman, assigning tasks to the mining vehicles and tracking their progress as they perform these tasks. Fleet manager 102 communicates with each vehicle via a radio link 108. Each vehicle includes an on-board vehicle control system 104. Vehicle control system 104 permits autonomous operation of the mining vehicle under the control of fleet manager 102. Vehicle control system 104 includes a navigator 120, a truck reference unit (TRU) 122, an obstacle detector 124, a machine control module (MCM) 126, and advanced diesel engine manager (ADEM) 128, an electronic programmable transmission control (EPTC) 130, and a vital information management system (VIMS) 132.

Navigator 120 receives instructions from fleet manager 102 via radio link 108. The instructions include, for example, a work assignment or task. From the task, navigator 120 determines a route to be followed. The route may be, for example, a haul segment between an excavation site and a crusher site in an open pit mining operation.

TRU 122 determines the actual position of the vehicle using the global positioning system (GPS) and an inertial reference unit (IRU). Based on the actual position and the desired route, navigator 120 generates a desired steering angle and a desired speed for the vehicle. Obstacle detector 124 is a radar unit which scans the area in front of the vehicle for obstacles. When obstacle detector 124 detects an obstacle, it provides an indication that an obstacle is detected and/or the location of the obstacle to navigator 120. Navigator 120 may then stop the vehicle or navigate around the obstacle.

Tele-operation panel 106 may be used to communicate, via radio signals as indicated at 110, steer angle, speed and other commands directly to navigator 120 to allow remote control operation of the vehicle.

Examples of fleet manager 102, tele-operation panel 106, navigator 120, TRU 122 (also known as a "vehicle positioning system") and obstacle detector 124 are described in detail in the '540 application which is incorporated by reference above. In addition, an example of tele-operation panel 106 is described in commonly owned, allowed copending U.S. patent application Ser. Appl. No. 08/299,448, titled "Remote Control System and Method for an Autonomous Vehicle," filed on even date herewith.

Navigator 120, TRU 122 and obstacle detector 124 represent on-board intelligence for the vehicle which allows autonomous control commands to be generated in the form of the speed and steering angle request signals. Before autonomous operation can be achieved, however, these commands or requests must be serviced.

The present invention services the steering and speed requests, among others, to achieve autonomous (or simply "auto") operation. MCM 126 receives the steering and speed requests from navigator 120 over a data bus 152. Over this same data bus, MCM 126 provides status and diagnostic information for the vehicle system; (e.g., steering, brakes, dump body, engine, transmission, etc.) to navigator 120. MCM 126 controls the vehicle with the aid of ADEM 128 and EPTC 130. MCM 126 provides monitoring and diagnostic information to navigator 120 with the aid of VIMS 132. In addition, VIMS 132 provides monitoring and diagnostic information directly to navigator 120 over a data bus 154.

ADEM 128 controls the speed or RPM (revolutions per minute) of the vehicle's engine. EPTC 130 controls gear selection in the transmission and ensures that the transmission is in the correct gear. VIMS 132 monitors different systems of the vehicle. ADEM 128, EPTC 130 and VIMS 132 are available from Caterpillar Inc. of Peoria, Ill. In addition, ADEM 128, EPTC 130 and VIMS 132 are available as standard equipment on many of Caterpillar's vehicles. However, as discussed below, ADEM 128 and EPTC 130 have been modified in accordance with the present invention to receive controlling inputs from MCM 126 as well as the standard operator inputs from an accelerator pedal and a shift cane, respectively.

Autonomous Operation

To achieve autonomous operation of the vehicle, the steering angle request and the speed request from navigator 120 must be answered by adjusting the steering angle and speed of the vehicle. MCM 126 compares the speed requested by navigator 120 with the actual vehicle speed and adjusts the vehicle speed, if required, by sending appropriate signals to ADEM 128, EPTC 130 and the vehicle's braking system. MCM 126 communicates these instructions to ADEM 128 and EPTC 130 over a data link 134. In addition, VIMS 132 monitors the status of ADEM 128 and EPTC 130 over and provides monitored parameters to MCM 126 over data link 134. In the preferred embodiment, data link 134 is a serial data bus such as a CAT Data Link, available from Caterpillar Inc.

MCM 126 communicates an engine RPM control signal to ADEM 128 over data link 134 to control engine speed. A second engine RPM control signal is also sent to ADEM 128 over a redundant line 136.

MCM 126 communicates a transmission control signal to EPTC 130 over data link 134 to select the top gear and direction (i.e., forward or reverse) of the transmission. The vehicle has an automatic transmission which is controlled by EPTC 130. The transmission control signal limits the top gear which may be used by the transmission and selects the direction of travel for the vehicle.

In conjunction with controlling vehicle speed, MCM 126 controls the braking system. In the preferred embodiment of the invention, the vehicle braking system includes a parking brake, a service brake/retarder system, and a secondary brake. The parking brake is a spring applied brake which requires air pressure to be released. Conversely, the service brake/retarder is spring released and requires air pressure to be applied. The secondary brake is similar to the service brake, but operates on a separate air reservoir. The parking brake is used for holding the truck when it is not in use and effects only the rear wheels. The service brake/retarder acts on both front and rear axles. The secondary brake actuates the service brake on the front axle and the parking brake on the rear axle.

MCM 126 controls these different brakes directly via control line 138 which actuates solenoid valves to control air pressure in the three systems. For example, when navigator 120 requests a speed lower than the present speed, MCM 126 decides whether the lower speed should be achieved by reducing engine RPM and/or by applying the service brakes. If braking is required, MCM 126 applies the brake in a smooth manner to avoid locking up the wheels.

In response to the steering angle request from navigator 120, MCM 126 directly controls the vehicle's steering by sending right steer and left steer signals 140 to solenoids which control steering.

In the preferred embodiment of the invention, autonomous vehicle system 100 is used to implement an autonomous vehicle haulage system. Using a number of dump trucks (such as the Caterpillar 777C), the haulage system is configured to carry a material such as rock from an excavation site to a crusher site. To permit fully autonomous operation of the vehicle, MCM 126 controls other features of the vehicle, such as dumping of the truck body. MCM 126 produces a dump signal 142 which actuates the hydraulic system of the vehicle to raise and lower the vehicle body. For safety considerations, MCM 126 also controls auxiliary functions of the vehicle such as the horn, lights and backup alarm via an auxiliary control line 144.

Thus, during autonomous operation, MCM 126 indirectly controls the engine and transmission via ADEM 128 and EPTC 130. MCM 126 directly controls the vehicle's braking systems, steering, body (i.e., raise or lower), lights (including head lights and autonomous operation strobe warning lights), horn and back-up alarm.

Manual Operation

MCM 126 implements autonomous operation of a vehicle. It is desirable, however, to also permit manual operation of the vehicle. In a manual mode of operation, the autonomous control features should be transparent and not affect normal functioning of the vehicle. Moreover, for safety, switching between an autonomous mode of operation and a manual mode of operation must be tightly controlled so that the vehicle remains in control at all times. The structure., and operation of MCM 126 which implements these features of the invention are described below.

MCM 126 permits manual operation by relinquishing control of the vehicle subsystems to an operator. In manual mode, ADEM 128 receives the speed request signal from an operator actuated throttle or accelerator pedal 144. Similarly, EPTC 130 receives top gear selection and direction commands from a shift cane 146 controlled by the operator. Brakes and steering are manually controlled by the operator using a conventional steering wheel and brake pedal. The body is controlled by a switch which actuates a solenoid in the hydraulic system.

During manual operation, MCM 126 will continue to monitor system parameters but will not interfere with control of the vehicle in any way.

Transitioning Between Manual and Autonomous Modes of Operation

MCM 126 defaults to manual mode at power-up. Manual mode is indicated to ADEM 128 and EPTC 130 via an auto/manual select signal sent over an auto/manual control line (AMCL) 150. For example, AMCL 150 is pulled HIGH by ADEM 128 and EPTC 130. When AMCL 150 is high, manual mode is indicated to ADEM 128 and EPTC 130. If autonomous mode is desired, MCM 126 will indicate this to ADEM 128 and AMCL 150 by pulling AMCL 150 LOW.

Transition into autonomous mode will only take place if the following conditions are met:

(1) vehicle speed is zero;

(2) parking brake is on;

(3) shift cane 146 is in neutral;

(4) a first auto/manual switch (located in the cab of the vehicle) is switched to autonomous mode; and (5) a second auto/manual switch (located near the ground on, for example, the front bumper of the vehicle) is switched to autonomous mode.

If these five conditions are met, MCM 126 will send an auto enable signal to navigator 120 over data bus 152. If navigator 120 is satisfied that all systems are functioning properly (based on status information provided by MCM 126 and VIMS 154), navigator 120 will send an auto mode signal back to MCM 126. Upon receipt of the return auto mode signal from navigator 120, MCM 126 will enter the autonomous mode. This involves MCM 126 switching ADEM 128 and EPTC 130 into autonomous mode by placing the proper signal on AMCL 150 (e.g., by pulling AMCL 150 low). The vehicle controls (e.g., ADEM 128 and EPTC 130) will then be ready to receive instructions from MCM 126, which in turn waits to receive instructions from navigator 120.

Once the vehicle is in autonomous mode, it will not switch back to manual mode until several conditions exist. These conditions reduce the possibility of the vehicle coming out of autonomous mode at an undesired time or condition, e.g., while the vehicle is in motion. Before the vehicle can switch from autonomous mode to manual mode, the following conditions must exist:

(1) vehicle speed is zero;

(2) parking brake is on;

(3) shift cane 146 is in neutral;

(4) engine RPM is at low idle; and (5) both the first and second auto/manual switches are in the manual position.

When these conditions exist, MCM 126 will place ADEM 128 and EPTC 130 in manual mode via AMCL 150. MCM 126 will also de-actuate all solenoid drivers used to control other functions of the vehicle, such as the body, auxiliary functions, brakes and steering.

FIG. 2 is a simplified block diagram illustrating the steps followed in transitioning between manual operation and autonomous operation. Manual operation is indicated at block 202. Autonomous operation is indicated at block 214. As indicated above, manual operation 202 is the default of MCM 126 upon power-up. If it is desired to switch into the autonomous operation mode and each of the conditions listed above is met, MCM 126 will cycle through steps 204–212 before reaching autonomous mode 214.

First, in a step 204, a speed self-test is executed. The speed self-test checks data link 134 to assure that it is operating properly and that ADEM 128 and EPTC 130 can be controlled by MCM 126. In addition, MCM 126 checks for brake pressure and assures that the brakes can be controlled. Next, in a step 206, a steering self-test is performed. In the steering self-test, the wheels of the vehicle are moved to assure that steering can be controlled, and that the change in the steering angle can be sensed via position sensors (not shown).

In a step 208, a wait state is entered. In the preferred embodiment, a five second pause is executed. At the beginning of the pause, the horn is honked and strobe lights are turned ON to warn any person near the vehicle that autonomous operation is being enabled. Thereafter, the vehicle enters a ready mode as indicated at step 210. In ready mode, MCM 126 is in control of the speed and the steering of the vehicle. The steering angle is set to zero degrees and the speed is maintained at zero miles per hour. The vehicle will remain in ready state until a valid command is received from navigator 120.

Once a valid command is received, MCM 126 will enter a second wait state as indicated at step 212. The second wait state is similar to the first. The horn is again honked and the strobe lights remain on from the first wait state. At the conclusion of this second wait state, autonomous mode begins as indicated at step 214.

If the speed self test at step 204 or the steering self test at step 206 fails, or if either of the auto/manual control switches are toggled to manual mode during any of steps 208–212, MCM 126 will abort the changeover to autonomous operation and will proceed directly to a step 216 which performs an orderly transition back to manual operation 202. The orderly transition or shut-down includes assuring that the vehicle speed is zero, the parking brake is on, the transmission is in neutral. The vehicle will stay in the transition mode until both of the auto/manual control switches are switched to manual mode. At this point, the vehicle can then return to manual operation as indicated in step 202.

Operator Intervention in Autonomous Mode

In the event that an operator is present in the vehicle while the vehicle is in autonomous mode, provisions have been provided for receiving and acting on certain manual operator inputs. An operator can alter the vehicles direction by manually operating the steering wheel. The cumulative effect on the steering angle will be dependent on the sum of the steering commands coming from the operator and the commands coming from MCM 126.

The operator will not be able to increase engine RPM. Because ADEM 128 is in the autonomous mode, the accelerator pedal will have no effect. Similarly, the operator will not be able to change the transmission top gear, because the shift cane position will be ignored by the EPTC 130. The operator can stop the vehicle by placing the first auto/manual control switch (the one located in the cab of the vehicle) into the manual position. This causes MCM 126 bring the vehicle to a controlled stop on the path.

An operator can increase the vehicle's deceleration by stepping on the service brake pedal or pulling on a retarder handle within the vehicle cab. MCM 126 will detect that the brakes are being manually applied by the changes in pressure in the braking system and will begin to slow the vehicle. Moreover, manual actuation of the service brake increases the applied braking force.

MCM 126

FIG. 3 is a block diagram of MCM 126. MCM 126 includes a microprocessor 302 (e.g., a Motorola 68332 microprocessor), a random access memory (RAM) 304, an erasable programmable read only memory (EPROM) 306, a flash electrically erasable programmable read only memory (EEPROM) 308, an input buffer 310, a communications module 312, a low level output driver 314 and a high level output driver 316. Each of these modules is connected via a 16 bit data bus 318. The programs which control operation of MCM 126 are stored in EPROM 306 and are executed by microprocessor 302. EEPROM 308 is used to store parameters used by the programs. These parameters may be changed to tune MCM 126 for operation on different vehicles.

Input buffer 310 receives MCM input signals from the various switches and sensors as indicated at line 309. For example, input buffer 310 receives a speed indication from a vehicle odometer, auto/manual select signals from the auto/manual control switches, and steering angle indications from the steering angle sensors. Processor 302 receives the various inputs from input buffer 310 by reading internal latches of buffer 310 via bus 318. In addition, a bus 317 provides a direct connection between input buffer 310 and input pins of processor 302. Bus 317 provides, for example, frequency modulated and pulse width modulated (PWM) signals directly to a timer module of processor 302. Second RPM control signal 136 is an example of a PWM signal.

Communications module 312 implements three communications ports for MCM 126. The first port is an RS232 serial communications port used to communicate with navigator 120 as indicated by data bus 152. The second port is an RS232 serial communications port available for diagnostic monitoring or debugging the operation of MCM 126 as indicated by line 322. The third port is used for communications with data link 134 using a serial communications protocol.

Low level output port 314 is used to connect AMCL 150 with MCM 126 and to provide the redundant throttle control to ADEM 128 via line 136. High level output module 316 includes nine high current drivers to control the solenoids which operate vehicle steering, brakes, body dumping, and various auxiliary features.

FIG. 4 is a task diagram illustrating structure and operation of the programs which run on processor 402 to implement the features of MCM 126. MCM 126 includes a sensor task 402, a data link task 404, a speed task 406, a steering task 408, an auxiliary task 410, a navigator communications task 412 and an executive task 416.

Sensor task 402 monitors various sensors on the vehicle and places status information in a global data store (within RAM 304) for use by other tasks in MCM 126. Sensor task 402 also provides the status information to executive task 416. Sensor task 402 receives much of its information from VIMS 132 over data link 134. In addition to the information received from VIMS 132, sensor task 402 monitors the first and second auto/manual switches on the vehicle as well as several independent sensors which have been specifically added to the vehicle to facilitate autonomous operation. These include, for example, resolvers to sense steering angle.

Data link task 404 manages communications between MCM 126 and ADEM 128, EPTC 130 and VIMS 132 over data link 134. The information communicated over the data link is provided to executive task 416 and speed task 406. Speed task 406 generates the engine RPM control signal and the transmission control signal which are communicated to ADEM 128 and EPTC 130 via data link task 404. In addition, speed task 406 directly controls the body of the vehicle, over line 142, and the three braking systems of the vehicle over line 138.

Vehicle speed is controlled in a closed loop fashion. When speed requests are received from navigator 120, they are compared to the actual vehicle speed as indicated in data store 304. The actual vehicle speed as indicated in data store 304 is continuously updated by sensor task 402.

Steering task 408 controls the steering of the vehicle via control line 140. Steering is controlled in a closed-loop manner by comparing the steering angle indicated in data store 304 with the requested steering angle received from navigator 120. Auxiliary task 410 controls auxiliary functions of the vehicle such as the horn and lights via an auxiliary control line 144. Navigator communications task 412 communicates with navigator 120 over line 152 which is a serial communications bus.

Executive task 416 manages operation of all other tasks in MCM 126. This involves controlling the transition between autonomous and manual operation modes.

EPTC 130

Control of the actual transmission gear is performed by EPTC 130. In the manual mode, the position of the cane lever communicates to the EPTC 130 the desired direction of travel in maximum allowable gear. EPTC 130 will shift the transmission through the gears and up to the maximum allowable gear as indicated by the shift lever. EPTC 130 receives the vehicle speed from VIMS 132 over data link 134 to be used in applying its gear shifting strategy. For additional information on manual operation of EPTC 130, see Caterpillar Service Manual No. SENR5666, titled "Electronic Programmable Transmission Control (EPTC II) For ICM Transmissions," May 1993, available from Caterpillar, Inc., Peoria, Ill., which is incorporated herein by reference.

When MCM 126 receives an autonomous mode request from navigator 120, MCM 126 places ADEM 128 and EPTC 130 into the autonomous mode by grounding AMCL 150. Once in the autonomous mode, EPTC 130 sends a broadcast stop message to MCM 126 over data link 134. This message tells MCM 126 to stop communications with EPTC 130. MCM 126 responds by sending a broadcast stop acknowledge message to EPTC 130 over data link 134. EPTC 130 then sends a broadcast request message to MCM 126 telling MCM 126 to send the transmission control signal. MCM 126 responds by sending a broadcast request response message to EPTC 130 before sending the transmission control signal. The transmission control signal is sent once per second.

This hand shaking between MCM 126 and EPTC 130 prior to the transmission of control signals assures that the communication link is functioning properly. If a failure in data link 134 occurs, EPTC 130 will assume a gear selection of neutral. That is, the transmission will stay in the present gear, or down shift when the vehicle speed so allows, until the vehicle is stopped. When EPTC 130 detects a change on AMCL 150 (e.g., a request to change from autonomous to manual, mode), EPTC 130 will select a gear of neutral and send out a broadcast stop request to MCM 126. MCM 126 will respond by sending a broadcast request response message. Then, if manual shift cane 146 is in neutral, EPTC 130 will enter manual mode. If manual shift cane 146 is not in neutral, EPTC 130 will hold the transmission in neutral and will remain in that state until neutral is indicated by manual shift cane 146. Any component problems detected by EPTC 130 are reported to VIMS 132 over data link 134.

These features of EPTC 131) are implemented by modifying the programmed microcode in EPTC 130. Microcode is added to EPTC 130 which operates a layer above the standard algorithm which controls shifting of the transmission. The functionality of the additional microcode is illustrated in the operational flow chart of FIG. 5 which presents a loop which executes every 25 milliseconds.

In FIG. 5, normal operation of the transmission is indicated at step 514. All other steps/blocks of FIG. 5 implement the features of the invention which allow EPTC 130 to operate in either a manual mode or an auto mode in conjunction with MCM 126. These features are now described with reference to the flowchart.

At power-up of EPTC 130, a reset occurs as indicated at step 502. After reset, the operating mode of EPTC 130 defaults to manual and a remote gear select (RGS) variable is set to neutral as indicated at step 504. The remote gear select or RGS variable is the transmission control signal received from MCM 136 over data link 134. EPTC 130 takes the transmission control signal and stores it in a memory location as a remote gear selection. When EPTC 130 is in manual mode, gear selection is controlled by the shift cane. When EPTC 130 is in auto mode, gear selection is controlled by RGS.

At step 506, AMCL 150 is checked. If AMCL 150 indicates manual operation, then the method proceeds to step 508. In step 508, a check is made to determine whether this is the first time AMCL 150 is indicating manual mode (i.e., a change from auto mode is occurring). If this is not the first indication of manual mode, then the method proceeds to step 510. At step 510, EPTC 130 is checked to determine whether EPTC is actually operating in auto or manual mode.

If EPTC 130 is operating in manual mode, then the manual shift lever or cane is checked for gear position at step 512. The transmission is then shifted according to the normal shifting algorithm of step 514. The method then returns to step 506. As long as AMCL 150 continues to indicate manual mode, EPTC 130 will continue to operate in this loop in which gear selection is taken from the manual shift cane.

If it is determined, at step 508, that this is the first time AMCL 150 has indicated manual mode (i.e., a change from auto to manual is occurring), then the method proceeds to step 530. At step 530, a broadcast stop message is transmitted to MCM 126 over data link 134 to initiate a change from auto mode to manual mode as discussed above. At step 532, the remote gear select variable is checked to determine whether it indicates neutral. If neutral is not indicated, a fault code indicating an invalid transition from auto mode to manual mode is sent to MCM 126 over data link 134. Then, at step 536, the manual shift cane is checked to determine whether it is in neutral. If neutral is indicated, then EPTC 130 is set to manual mode in step 538. If the cane does not indicate neutral, then the remote gear select variable is set to neutral and a fault code for an invalid transition is sent to MCM 126 over data link 134 at step 540. If, at step 510, it is determined that EPTC 130 is in auto mode, then the method proceeds to step 536 and continues as discussed above.

Thus, when it is determined at step 506 that AMCL 150 is indicating manual mode, EPTC 130 will take a desired top gear indication from the manual shift cane as indicated at step 512. Steps 508, 530, 532, 534, 536, 538, and 540 assure that transition from auto mode to manual mode is done in an orderly fashion as outlined above. These steps also ensure that a fault on AMCL 150 will not inadvertently place EPTC 130 in manual mode.

If, at step 506, it is determined that AMCL 150 indicates autonomous operation, then the method proceeds to step 516. At step 516, it is checked to determine whether this is the first time that AMCL 150 has indicated autonomous operation (i.e., a transition from manual to auto is occurring). If yes, then the method proceeds to step 518 where EPTC 130 sends a broadcast request signal to MCM 126 to initiate the signal handshaking (discussed above) which assures proper functioning of the communication link between MCM 126 and EPTC 130. In addition, at step 518, EPTC 130 sets the remote gear select (RGS) variable to neutral and sets the EPTC 130 mode to auto.

A remote gear selection is generally received three times per second from MCM 126. This is tested at step 520. If a remote gear selection has not been received in the last three seconds, then a fault condition is indicated to MCM 126 over data link 134 (CDL or Cat Data Link in FIG. 5) at step 522. In addition, the remote gear select is set to neutral. The method then proceeds to step 514 where the transmission is shifted in accordance with the standard shifting algorithm. If a fault condition was indicated at step 522, then MCM 126 will reduce engine speed while the RGS of neutral causes EPTC 130 to downshift until the transmission is in neutral and the vehicle can be stopped.

ADEM 128

ADEM 128 is responsible for governing the speed or RPM of the vehicle's engine. In manual mode, manual throttle or accelerator pedal 144 provides an RPM request which is compared to the actual RPM of the engine. ADEM 128 then adjusts injector fuel delivery to make the actual RPM equal the desired RPM. For additional information on manual operation of ADEM 128, see Caterpillar Electronic Troubleshooting Manual No. SENR5191-02, titled "3508 EUI Engine," June 1994, available from Caterpillar, Inc., Peoria, Ill., which is incorporated herein by reference.

When MCM 126 receives a autonomous mode indication from navigator 120, MCM 126 places ADEM 128 into autonomous mode via AMCL 150. Once in autonomous mode, ADEM 128 will ignore the manual throttle control and accept engine speed command signals from MCM 126. MCM 126 computes a desired engine RPM based on the speed request from navigator 120. The desired RPM is then sent to ADEM 128 over data link 134. Similar to EPTC 130, ADEM 128 handshakes signals with MCM 126 prior to opening communications for RPM request signals. For example, when ADEM 128 first detects a manual-to-autonomous status change request on AMCL 150, ADEM 128 enters autonomous mode and then sends a broadcast stop command over data link 134. MCM 126 stops communications with ADEM 128 and responds to the, broadcast stop command. MCM 126 then responds with a broadcast stop acknowledgement message. ADEM 128 then sends a broadcast request message, asking MCM 126 for RPM request signals. MCM 126 responds by sending a broadcast request response message and then by sending desired RPM signals once per second. ADEM 128 receives the speed request signals from MCM 126 over the data link. In addition, however, a redundant speed request signal is also generated by MCM 126 and sent to ADEM 128 over a dedicated wire 136. This redundant signal can be used by ADEM 128 if the speed request signal is not sent on data link 134. If both signals are absent, ADEM 128 will set the engine to low idle and communicate the loss of communications to VIMS 132.

When ADEM 128 detects the request to change from autonomous to manual mode on AMCL 150, ADEM 128 sends a broadcast stop request to MCM 126 over data link 134. MCM 126 responds with a broadcast stop acknowledgement message. ADEM 128 then begins reading the signal coming from the manual throttle 144. If the manual throttle 144 requests low idle, ADEM 128 fully enters manual mode. If the signal is not low idle, ADEM 128 will stay in autonomous mode and set the speed at low idle and will not return fully to manual mode until manual throttle 144 indicates a speed of low idle.

FIG. 6 illustrates high level operation of ADEM 128 according to the invention. As with EPTC 130, ADEM 128 has been modified to add microcode which operates a layer above the standard algorithm which controls engine RPM. The functionality of the additional microcode is illustrated in the operational flow chart of FIG. 6 which presents a loop which executes every 15 milliseconds. The remaining steps of FIG. 6 implement the features of the invention which allow ADEM 128 to be controlled by MCM 126.

In FIG. 6, normal operation of the engine is indicated at step 614. All other steps/blocks of FIG. 6 implement the features of the invention which allow ADEM 128 to operate in conjunction with MCM 126. These features are now described with reference to the flowchart.

At power-up of ADEM 128, a reset occurs as indicated at step 602. After reset, the operating mode of ADEM 128 defaults to manual and a desired RPM variable is set to low idle (LI) as indicated at step 604. The desired RPM variable is the engine RPM control signal communicated to ADEM 128 by MCM 126 over data link 134. ADEM 128 takes the engine control signal and stores it in a memory location as a desired RPM or DRPM. When ADEM 128 is in manual mode, engine speed is controlled by the manual accelerator pedal. When ADEM 128 is in auto mode, engine speed is controlled by DRPM.

At step 606, AMCL 150 is checked. If AMCL 150 indicates manual operation, then the method proceeds to step 608. In step 608, a check is made to determine whether this is the first time AMCL 150 is indicating manual mode (i.e., a change from auto mode is occurring). If this is not the first indication of manual mode, then the method proceeds to step 610. At step 610, ADEM 128 is checked to determine whether it is actually operating in auto or manual mode. If ADEM 128 is operating in manual mode, then the manual accelerator pedal is checked for position at step 612. The engine RPM is then controlled according to the normal engine RPM algorithm of step 614. The method then returns to step 606. As long as AMCL 150 continues to indicate manual mode, ADEM 128 will continue to operate in this loop in which engine RPM is taken from the manual accelerator pedal.

If it is determined, at step 608, that this is the first time AMCL 150 has indicated manual mode (i.e., a change from auto to manual is occurring), then the method proceeds to step 630. At step 630, a broadcast stop message is transmitted to MCM 126 over data link 134 to initiate a change from auto mode to manual mode as discussed above. At step 632, the DRPM variable is checked to determine whether it indicates low idle or LI. If low idle is not indicated, a fault code indicating an invalid transition from auto mode to manual mode is sent to MCM 126 over data link 134. Then, at step 636, the manual accelerator pedal is checked to determine whether it is in a low idle position. If low idle is indicated, then ADEM 128 is set to manual mode in step 638. If the pedal does not indicate low idle, then the DRPM variable is set to low idle and a fault code for an invalid transition is sent to MCM 126 over data link 134 at step 640. If, at step 610, it is determined that ADEM 128 is in auto mode, then the method proceeds to step 636 and continues as discussed above.

Thus, when it is determined at step 606 that AMCL 150 is indicating manual mode, ADEM 128 will take a desired RPM from the manual accelerator pedal as indicated at step 612. Steps 608, 630, 632, 634, 636, 638, and 640 assure that transition from auto mode to manual mode is done in an orderly fashion as outlined above. These steps also ensure that a fault on AMCL 150 will not inadvertently place ADEM 128 in manual mode.

If, at step 606, it is determined that AMCL 150 indicates autonomous operation, then the method proceeds to step 616. At step 616, it is checked to determine whether this is the first time that AMCL 150 has indicated autonomous operation (i.e., a transition from manual to auto is occurring). If yes, then the method proceeds to step 618 where ADEM 128 sends a broadcast request signal to MCM 126 to initiate the signal handshaking (discussed above) which assures proper functioning of the communication link between MCM 126 and ADEM 128. In addition, at step 618, ADEM 128 sets the DRPM variable to low idle and sets the ADEM mode to auto.

A DRPM signal is generally received three times per second from MCM 126. This is tested at step 620. If a remote gear selection has not been received in the last three seconds, then a data link fault condition is indicated to MCM 126 over data link 134 (CDL or Cat Data Link in FIG. 6) at step 622. Then, at step 624, the method checks to see whether the second engine RPM control signal (a PWM or pulse width modulated signal received from MCM 126 over line 136) is present at ADEM 128. If the second or PWM engine RPM control signal is present, then the method uses the PWM signal as the DRPM at step 626. If the second or PWM engine RPM control signal is not present, then a PWM fault condition is indicated to MCM 126 over data link 134 and the DRPM is set to low idle at step 628.

The method then proceeds to step 614 where the engine is shifted in accordance with the standard shifting algorithm. If fault conditions were indicated at steps 622 and 628, then ADEM 128 will reduce the engine speed to low idle as set forth in step 628, and MCM 126 will cause the vehicle to come to a stop. If a fault condition is indicated only at step 622 and not step 628, then the vehicle may continue to operate using the second engine RPM control signal (the PWM signal) to set the DRPM.

VIMS 132

Monitoring the status of the various vehicle systems is provided by VIMS 132. VIMS 132 gathers information by reading dedicated sensors on the vehicle and also by receiving information from ADEM 128 and EPTC 130 over data link 134. VIMS uses the collected information to determine a machine warning level. The machine warning level indicates the highest fault level present on the vehicle. It transmits this information directly to navigator 120 via line 154. VIMS 132 also provides this information to MCM 126 via data link 134. Navigator 120 may stop the vehicle by sending a zero speed request to MCM 126. In addition, if a serious fault condition exists, MCM 126 may stop the vehicle directly.

Sample warning level indicators include the following:

Level I: An example of a Level I warning is a fluid level out of normal operating range. In the case of a Level I warning, the vehicle continues full autonomous operation. However, the navigator indicates to the fleet manager that attention is needed to correct the condition in due course.

Level II: An example of a Level II warning is an excessive engine operating temperature. The Level II warning indicates that a condition exists that will cause serious damage to the vehicle if operation is not changed.

Level III: Examples of Level III warnings include low air pressure, low oil pressure and lack of coolant flow. In the case of a Level III warning, the vehicle should be stopped without delay. To accomplish this, navigator 120 commands MCM 126 to stop the vehicle immediately.

The parameters monitored by VIMS 132 include, for example, transmission charge filter, fuel filter, coolant flow, steering flow, brake master cylinder overstroke, engine oil level, transmission oil temperature, torque converter oil temperature, after cooler temperature, brake oil temperature, primary system air pressure, secondary system air pressure, steering fluid temperature, right turbo temperature, left turbo temperature, cab air temperature, left rear strut pressure, right rear strut pressure, left front strut pressure, right front strut pressure, speed, gear position, parking brake, body raise, engine RPM, engine oil pressure, atmospheric pressure, right turbo inlet pressure, jacket water temperature, rack position, boost pressure, fuel flow, and air filter restriction.

For additional information on VIMS 132, see Caterpillar Service Manual No. SENR6059, titled "Vital Information Management System (VIMS)," July 1993, available from Caterpillar, Inc., Peoria, Ill., which is incorporated herein by reference.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A system for controlling autonomous operation of a vehicle in response to a speed request signal and a steering angle request signal from a navigator and for selectively allowing manual operation of the vehicle, the system comprising:

machine control means for receiving an auto/manual select signal, said speed request signal and said steering angle request signal and for producing a speed control signal, a steering angle signal, and an auto/manual control signal;

speed control means for controlling the speed of the vehicle in response to said speed control signal and an operator input when said auto/manual control signal indicates autonomous operation and in response only to said operator input when said auto/manual control signal indicates manual operation; and steering control means for controlling the steering angle of the vehicle in response to said steering angle control signal and an operator input when said auto/manual control signal indicates autonomous operation and in response only to said operator input when said auto/manual control signal indicates manual operation.

2. The system of claim 1, wherein said machine control means comprises:

a processor; and program means for enabling said processor to control autonomous operation of the vehicle said program means including navigator communications means for enabling said processor to receive said speed request signal and said steering angle request signal from the navigator, sensor means for enabling said processor to receive a measured steering angle, a measured speed and said auto/manual select signal, speed control signal means for enabling said processor to generate said speed control signal, in response to said speed request signal and said measured speed to control an engine, a transmission and a brake disposed in the vehicle and for enabling said processor to control the dumping of a body of the vehicle, steering means for enabling said processor to generate said steering angle control signal in response to said steering angle request signal and said measured steering angle, data link means for enabling said processor to communicate said speed control signal to an engine controller disposed in the vehicle and to communicate said steering control signal to a transmission controller disposed in the vehicle, and executive means for enabling said processor to supervise said program means and to generate said auto/manual control signal in response to said auto/manual select signal.

3. The system of claim 2, wherein said program means further comprises auxiliary means for enabling said processor to control auxiliary functions on the vehicle.

4. A system for controlling autonomous operation of a vehicle in response to speed and steering angle request signals from a navigator and for selectively allowing manual operation of the vehicle, the system comprising:

machine control means for receiving an auto/manual select signal, said speed request signal and said steering angle request signal and for producing an engine RPM control signal, a transmission control signal, a brake control signal, a steering angle control signal, and an auto/manual control signal;

engine RPM control means for controlling an RPM of a vehicle engine in response to said RPM control signal when said auto/manual control signal indicates autonomous operation and in response to an operator input when said auto/manual control signal indicates manual operation; and transmission control means for controlling a gear selection in a vehicle transmission in response to said transmission control signal when said auto/manual control signal indicates autonomous operation and in response to an operator input when said auto/manual control signal indicates manual operation.

5. The system of claim 7, wherein said machine control means comprises:

a processor; and program means for enabling said processor to control autonomous operation of the vehicle, said program means including navigator communications means for enabling said processor to receive said speed request signal and said steering angle request signal from the navigator, sensor means for enabling said processor to receive a measured steering angle, a measured speed and said auto/manual select signal, speed control means for enabling said processor to generate said RPM control signal, said transmission control signal and said brake control signal in response to said speed request signal and said measured speed, steering means for enabling said processor to generate said steering angle control signal in response to said steering angle request signal and said measured steering angle, and executive means for enabling said processor to supervise said program means and to generate said auto/manual control signal in response to said auto/manual select signal.

6. The system of claim 5, wherein said program means further comprises:

data link means for enabling said processor to communicate said engine RPM control signal to said engine RPM control means and for enabling said processor to communicate said transmission control signal to said transmission control means.

7. The system of claim 6, wherein said program means further comprises:

auxiliary means for enabling said processor to control auxiliary functions on the vehicle.

8. A system for controlling autonomous operation of a vehicle in response to a speed request signal and a steering angle request signal generated by a navigator, comprising:

a processor; and program means for enabling said processor to control autonomous operation of the vehicle, said program means including navigator communications means for enabling said processor to receive the speed request signal and the steering angle request signal from the navigator, p1 sensor means for enabling said processor to receive a measured steering angle, a measured speed and an auto/manual select signal, executive means for enabling said processor to supervise said program means and to generate an auto/manual control signal in response to said auto/manual select signal, speed control means for enabling said processor to control vehicle speed in response to the speed request signal and said measured speed only when said auto/manual control signal indicates autonomous operation, wherein said speed control means includes means for generating an engine RPM request signal in response to the speed request signal to adjust the RPM of an engine disposed in the vehicle, means for generating a transmission control signal in response to the speed request signal to adjust gear selection of a transmission disposed in the vehicle, and means for generating a brake control signal in the vehicle in response to the speed request signal to decrease the speed of the vehicle by applying a braking action on a brake disposed in the vehicle, and steering means for enabling said processor to control vehicle steering in response to the steering angle request signal and said measured steering angle only when said auto/manual control signal indicates autonomous operation.

9. The system of claim 1, wherein said program means further comprises:

data link means for enabling said processor to communicate said engine RPM request signal to an engine controller disposed in the vehicle and for enabling said processor to communicate said transmission control signal to a transmission controller disposed in the vehicle.

10. The system of claim 9, wherein said speed control means further comprises:

means for controlling a dump position of a body of said vehicle.

11. The system of claim 10, wherein said program means further comprises:

auxiliary means for enabling said processor to control auxiliary functions on the vehicle.

12. The system of claim 5, wherein said auxiliary means comprises:

means for switching power to lights disposed in the vehicle; and means for sounding a horn disposed in the vehicle.

* * * * *

UNITED STATES PATENT AND TRADEMARK OFFICE
CERTIFICATE OF CORRECTION

PATENT NO. : 5,469,356
DATED : November 21, 1995
INVENTOR(S) : Mark R. Hawkins et al It is certified that error appears in the above-identified patent and that said Letters Patent is hereby corrected as shown below:

Claim 5, column 15, line 16: change "7" to --4--.

Claim 8, Column 16, line 6, delete "p1".

Claim 9, column 16, line 34: change "1" to --8--.

Claim 12, column 16, line 51: change "5" to --11--.

Signed and Sealed this

Twenty-fourth Day of September, 1996

Attest:

BRUCE LEHMAN

Attesting Officer      Commissioner of Patents and Trademarks